Sept. 20, 1932.  W. TURNER  1,878,917

FLUID PRESSURE INDICATOR FOR PNEUMATIC TIRES AND OTHER INFLATED BODIES

Filed Jan. 3, 1930

INVENTOR

William Turner,

BY

ATTORNEY

Patented Sept. 20, 1932

1,878,917

UNITED STATES PATENT OFFICE

WILLIAM TURNER, OF SHEFFIELD, ENGLAND

FLUID PRESSURE INDICATOR FOR PNEUMATIC TIRES AND OTHER INFLATED BODIES

Application filed January 3, 1930, Serial No. 418,377, and in Great Britain May 15, 1929.

This invention relates to fluid pressure indicators or gauges for use upon pneumatic tires or other inflated bodies of the kind which is applied directly to the valve tube of the inflated body after removal of the cap so as to place the pressure chamber of the gauge into communication with the interior of the inflated body, and in which the pressure indicating member is formed separately from the pressure-actuated member and is adapted to be moved outwardly thereby to give an indication of the pressure, and to be retained in its indicating position when the gauge is removed and the pressure-actuated member is retracted.

In the improved construction of such apparatus constituting the present invention, the pressure cylinder of the gauge has an enlarged head or cap recessed at one side to receive a luting ring or washer of india rubber or equivalent material which, when pressed directly upon the end of the valve tube of the tire or the like, forms an air-tight joint between the gauge cylinder and the tire valve, and into the wall of the enlarged head is screwed a pin which passes through a central aperture in the recess, leaving a small clearance for the passage of air from the tire to the gauge, this pin serving to engage the valve pin of the tire valve and force the valve off its seat, and also as an anchor for one end of a coiled tension spring the other end of which is attached to the piston or pressure member of the gauge.

This piston is fitted with a cup leather or equivalent packing to make an air-tight sliding fit with the pressure cylinder of the gauge, and its stem has a screw thread $i'$ formed on it upon which the end of the coiled spring is screwed to a greater or less extent, as may be required for adjustment purposes.

Figure 1:
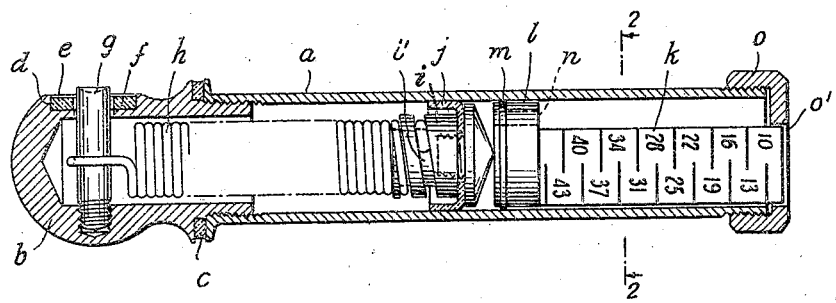
Figure 2:
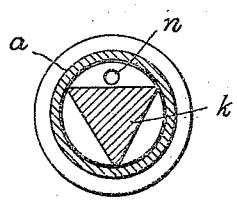

The invention is illustrated in the accompanying drawing in which Fig. 1 is a longitudinal section and Fig. 2 a transverse section on line 2—2 in Fig. 1.

The pressure cylinder $a$ of the gauge has an enlarged cap or head $b$ screwed into one end, a packing ring $c$ being interposed to form an air-tight joint. The wall at one side of the head has a recess $d$ to receive an india rubber luting ring or washer $e$, and this recess has a central aperture $f$ through which a pin $g$ passes and is screwed into the opposite wall of the head $b$. The outer end of this pin $g$ is arranged to project sufficiently to engage the valve pin of the usual type of tire valve, and to displace the valve from its seating when the rubber washer $e$ is firmly pressed against the end of the tire valve tube.

The aperture $f$ is slightly larger than the diameter of the pin, so that the area of the air passage left between them is small enough to check any sudden inflow of air from the tire or the like into the gauge, such a sudden inflow tending to give inaccurate readings.

The pin $g$ also constitutes the anchor for one end of a coiled tension spring $h$, which is in part accommodated within the hollow cap $b$ and the other end of which is attached to the pressure member or piston $i$, preferably in an adjustable fashion by screwing the end of the coiled spring into a thread $i'$ cut on the stem of the piston $i$. The piston $i$ is made an air-tight fit with the pressure cylinder $a$, as by means of a cup leather $j$. Cooperating with the piston $i$ is the indicator stem $k$ which, as shown, is preferably of triangular section and has upon each of its several faces a graduated scale of pressures. The inner end of the indicator stem $k$ has a cylindrical head $l$ which, by means of a spring ring $m$ or the equivalent thereof, is friction-tight in the cylinder $a$, so that when the indicator stem is pushed outwards it will remain in the position to which it has been expelled when the gauge has been removed from the tire valve and the piston $i$ is retracted.

To ensure that the indicator stem $k$ will not be retracted by the suction established between its head $l$ and the piston $i$ when the latter is drawn back by its spring $h$, an aperture $n$ is provided in the head $l$ so as to break the vacuum between the head and the piston $i$. The triangular stem $k$ extends through and is guided by a triangular aperture $o'$ in a cap $o$ which is screwed on to the outer end of the pressure cylinder $a$, and this cap $o$ also serves to prevent the indicator stem $k$ from being completely pushed out from the pressure cylinder.

To prevent any tendency of the piston $i$ to adhere to the cylindrical head $l$, the adjacent faces of the piston and the head $l$ are coned or curved, or one of them is coned or curved so that there is substantially a point contact between the two.

Having thus described the nature of the said invention and the best means I know of carrying the same into practical effect, I claim:—

1. A fluid pressure gauge of the character herein described comprising a pressure cylinder, a hollow cap on one end thereof, said cap having a circular aperture in one of its sides, a transverse pin of a diameter slightly less than the said aperture secured within said cap and extending with small clearance through said aperture, a pressure-actuated member slidably mounted within said pressure cylinder, and a coiled spring extending into the said hollow cap and connected with said pressure member and said transverse pin.

2. A fluid pressure gauge of the character herein described comprising a pressure cylinder, a hollow cap on one end thereof, said cap having a circular aperture in one of its sides, a transverse pin of a diameter slightly less than the said aperture secured within said cap and extending with small clearance through said aperture, a pressure-actuated member slidably mounted within said pressure cylinder and having a screwthread cut thereon, and a coiled spring extending into the said hollow cap and having one end screwed upon said screwthread and its other end connected with said transverse pin.

3. A fluid pressure gauge of the character herein described, comprising a pressure cylinder, a hollow cap on one end thereof, said cap having a circular aperture in one of its sides, a transverse pin of a diameter slightly less than the said aperture secured within said cap and extending with small clearance through said aperture, a pressure-actuated member slidably mounted within said cylinder, a coiled spring extending into said hollow cap and connected with said pressure-actuated member and said transverse pin, and a longitudinally movable pressure-indicating member cooperating with said pressure-actuated member and making friction-tight contact with said pressure cylinder.

4. A fluid pressure gauge of the character herein described, comprising a pressure cylinder, a cap on one end thereof, said cap having a circular apertured recess formed in one of its sides, a luting ring seated in said recess and having an aperture registering with the aperture in the cap, a transverse pin of a diameter slightly less than the said aperture secured within the cap and extending with small clearance through said apertures, a pressure-actuated member slidably mounted within said pressure cylinder, a screwthread cut on said pressure-actuated member, a coiled spring having one end screwed on said screwthread and the other end connected with said transverse pin, and a longitudinally movable pressure-indicating member having a portion making friction-tight contact with said pressure cylinder and substantially point contact with said pressure-actuated member, said friction-tight contact-making portion being apertured longitudinally, said pressure indicating member having an indicating stem of triangular cross section.

In testimony whereof I have signed my name to this specification.

WILLIAM TURNER.